Fig. 1

Patented Apr. 12, 1932

1,854,111

UNITED STATES PATENT OFFICE

EARL W. CURTIS, OF CLEVELAND, OHIO

CROSSCUT SAWING MACHINE

Application filed February 5, 1930. Serial No. 425,959.

This invention relates to cross-cut sawing machines and particularly that type of cross-cut sawing machines which is adapted to be secured to the tree or log or the like which is to be sawed. In devices of this character it is generally customary to provide a support which is secured to the timber which is to be cut and mount the saw movably on this support so that the saw may be given a reciprocating movement and also a movement towards the timber being cut. My invention relates to an improvement on the form of cross-cut sawing machine described and claimed in my Patent No. 1,450,357 dated April 3, 1923.

One object of this invention is to provide an improved means for clamping the supporting carriage to the timber which is to be cut.

Another object of this invention is to provide an improved means for moving the carriage which supports the saw towards and from the timber which is to be cut. This feeding means is so arranged as to provide for different amounts of feed and for giving varying amounts of pressure to the saw so as to increase or decrease the cutting effect which the saw has on the timber being cut. It is very necessary that the pressure on the saw, as well as the rate of feed be regulated in view of the fact that when cutting a tree of small diameter, a more rapid rate of feed may be used than when a tree having a larger diameter is being cut.

Another object of this invention is to provide means for yieldingly urging the saw towards the timber being cut to more nearly approximate a manual cutting of a tree and so as not to cause the saw to jam or bind in the saw cut.

Another object of this invention is the provision of fluid means for controlling the reciprocations of the saw. In the present instance I have illustrated a pneumatically operated saw, but it will be understood that other fluid such as a liquid may be used to reciprocate the saw without departing from the spirit of the invention as set forth in the appended claims.

Another object of this invention is to provide an improved means for controlling the movement of the piston for reciprocating in a cylinder for the purpose of imparting reciprocation to the saw. This means preferably includes a rotary valve for alternately introducing fluid into one end of the cylinder and then the other.

A more specific object of this invention is the provision of means for storing up energy during the reciprocation of the piston to cause quick actuation of the valve which controls the fluid when the piston reaches one end of the path of its travel.

Another object of this invention is the provision of a single means for storing up energy in the valve actuating means and for simultaneously causing a feeding movement to the saw supporting carriage.

A still further object of this invention is the provision of an improved means for automatically stopping the reciprocation of the saw whenever the support for the carriage is unclamped from the timber being cut. This arrangement insures that if the support should accidentally become unclamped from the timber being cut while the saw is in the saw cut, as well as at other times, the reciprocations of the saw will be stopped so as to prevent any damage either to the apparatus or to the operator.

Still another object of this invention resides in the provision of means for detachably connecting the piston rod to the saw to enable the saw to be replaced or to enable the apparatus to be readily disassembled.

Other objects of this invention will appear hereinafter as the description of the invention proceeds.

Figure 1:
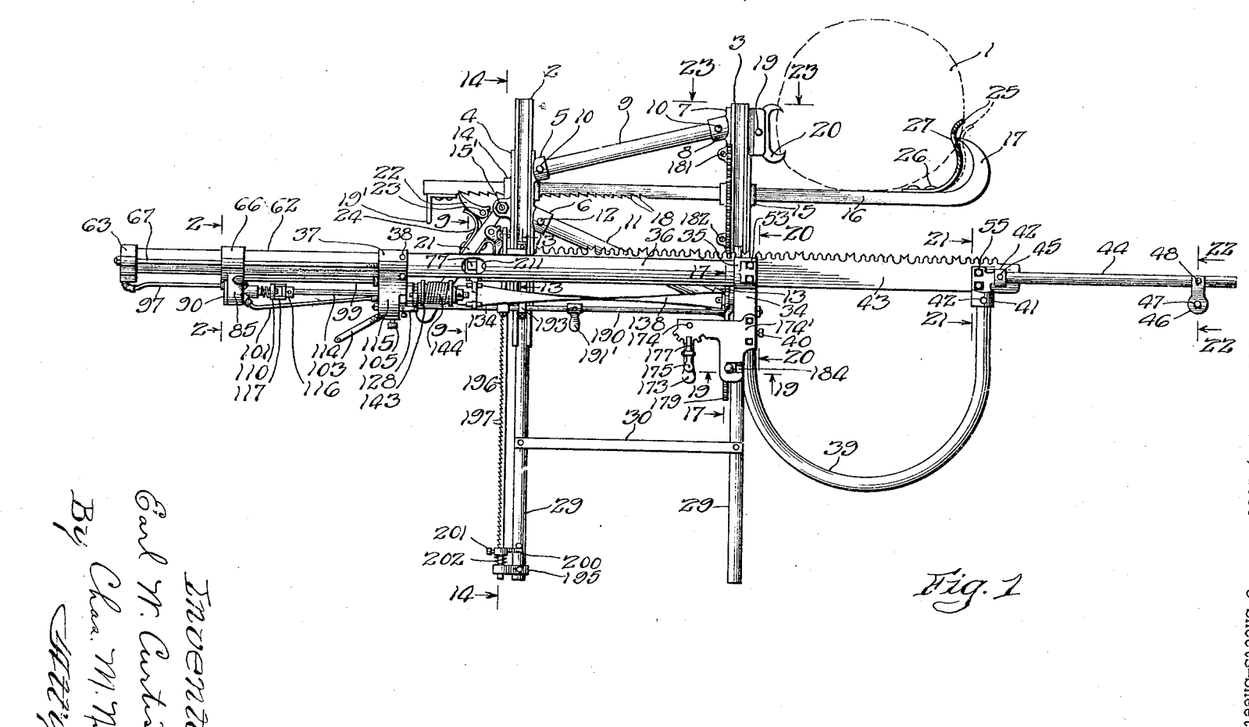
Fig. 1 represents a plan view of a device embodying my invention.
Figures 14, 15, 16, 17, 18, 19:
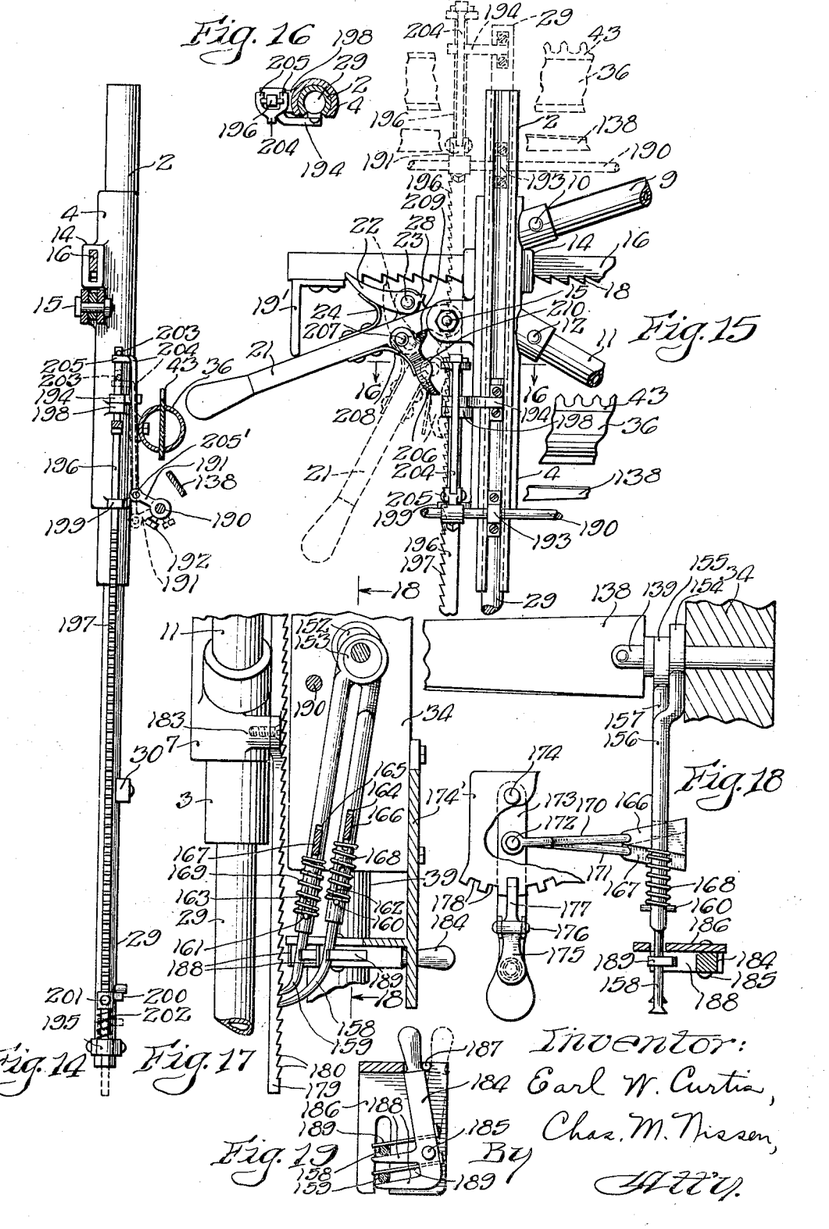
Fig. 14 is a section taken substantially along the line 14—14 of Fig. 1.
Fig. 15 is a fragmentary view of a portion of the clamping mechanism for clamping the saw carriage support to the timber being cut.
Fig. 16 is a section taken substantially along the line 16—16 of Fig. 15.
Fig. 17 is a section taken substantially along the line 17—17 of Fig. 1.
Fig. 18 is a section taken substantially along the line 18—18 of Fig. 17.
Fig. 19 is a section taken along the line 19—19 of Fig. 1.
Figures 20, 21, 22, 23, 24, 25, 26:
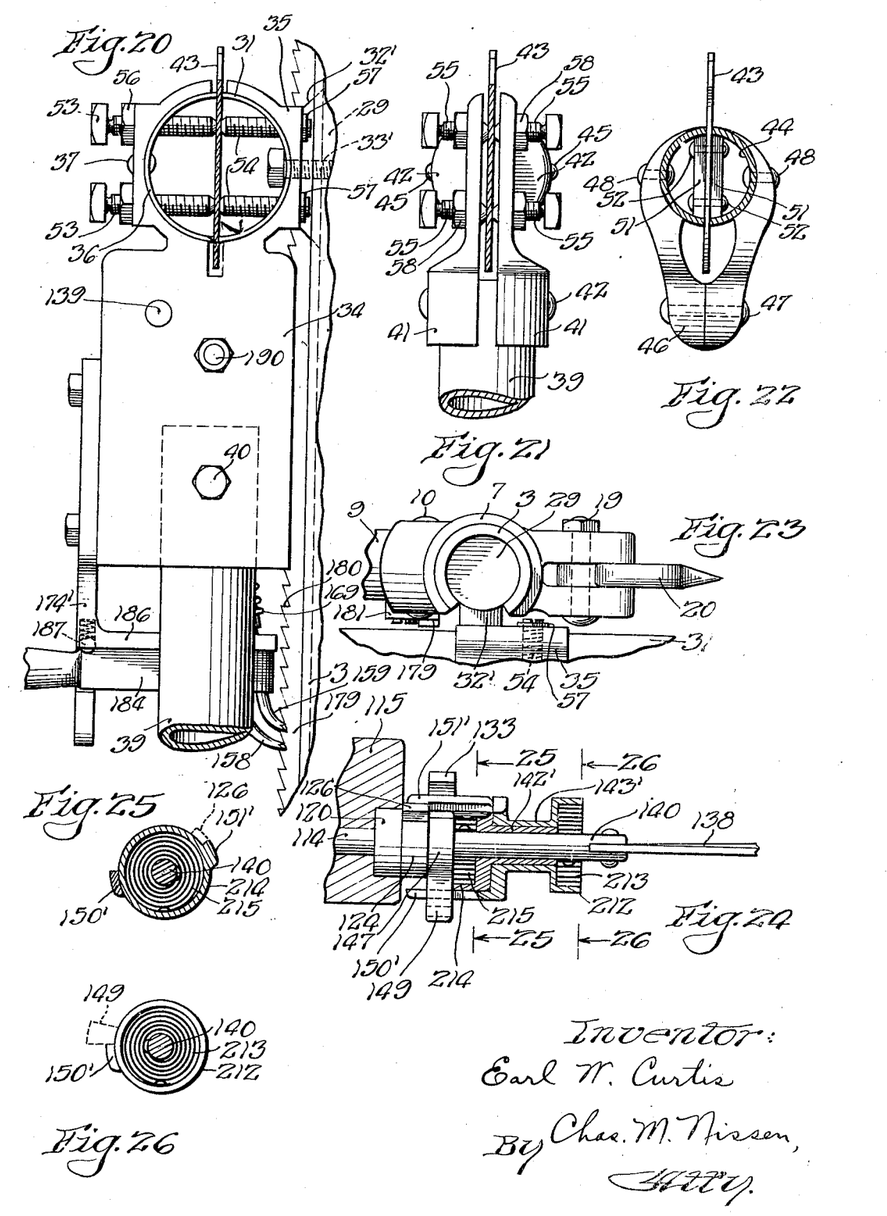
Fig. 20 is a section taken along the line 20—20 of Fig. 1.
Fig. 21 is a section taken along the line 21—21 of Fig. 1.
Fig. 22 is a section taken along the line 22—22 of Fig. 1.
Fig. 23 is a section taken along the line 23—23 of Fig. 1.
Fig. 24 shows a modification of the means illustrated in Fig. 6 and at the extreme right in Fig. 4.
Fig. 25 is a section taken along the line 25—25 of Fig. 24.
Fig. 26 is a section taken along the line 26—26 of Fig. 24.

Referring now more particularly to Fig. 1, the numeral 1 represents the timber which is being cut and we will assume for the purposes of this description that the timber is still standing and that we are looking at a cross-section of the same from above. The carriage support comprises tubular guides 2 and 3 having a cross section substantially as illustrated in Figs. 16 and 23, a casting 4 partially encircles the tubular guide 2 and is provided with tubular bosses 5 and 6 which extend outwardly at an angle therefrom in the direction of the tubular guide 3. The tubular guide 3 is provided with a casting 7 having a tubular boss 8 extending at an angle thereto and in a direction of the tubular guide 2. The axis of the tubular bosses 5 and 8 are arranged substantially in alinement with each other and a bracing rod 9 extends within the tubular boss 5 and the tubular boss 8 and is secured in each of these bosses by means of a screw or rivet 10. A second rod 11 has one end thereof fitted in the tubular boss 6 and secured thereto by a means such as the rivet or screw 12. The other end of the rod 11 is fitted within a tubular boss 13 surrounding the tubular guide 3 formed in a casting secured to the tubular guide 3, it being understood that the castings 4 and 7 are also secured to the guides 2 and 3. The casting carrying the boss 13 may be the same or a different casting than that which carries the boss 8, but it will be understood that in either case the effect is substantially the same. By means of the rods 9 and 11, the tubular guides 2 and 3 are maintained in substantially parallel arrangement with each other and prevented from shifting movement relatively to each other.

The castings 4 and 7 are provided with bearings 14 and 15 through which a rod 16 extends. The bar 16 is provided at one end with a spud 17 which is in the form of a single hook integral with the rod 16. The other end of the bar 16 is provided with a set of ratchet teeth 18 and a handle 19'. The casting 7 is also provided with a pivot 19 carrying a two-pronged spud 20, which spud is arranged in opposed relation to the spud 17. The casting 4 has a handle 21 pivoted thereto at 15' and this handle carries a pawl 22 pivoted thereto at 23 and yieldingly held in engagement with the ratchet teeth 18 by means of a spring 24.

The means just described is for clamping the carriage support to the tree 1 in a manner similar to that disclosed in my aforesaid patent.

The spuds 20 and 17 are arranged on opposite sides of the tree and the handle 19' is grasped and the spuds drawn towards each other as much as possible by manual force, the pawl 22 riding over the ratchet teeth and preventing reverse movement of the bar 16. To produce the final clamping pressure however, one grasps the handle 21 and moves it in a clockwise direction as viewed in Fig. 15, and this movement moves the pawl 22 to the left as viewed in either Figs. 1 or 15, and as a result the bar 16 is given a further movement to the left so that the spuds 17 and 20 penetrate the outer surface of the tree and hold the support for the carriage in the desired position. It will be noted from an inspection of Fig. 15 that the pivotal connection 23 between the handle 21 and pawl 22 is arranged below a line through the pivot 15 and the point of engagement of the pawl 22 with the root of the ratchet tooth engaged thereby when the handle 21 is in the dotted line position. Also it will be noted that when the handle is in the full line position, the pivotal connection 23 is above the aforementioned line. This arrangement is such as to always insure that when the handle 21 is moved to the full line position, the pawl 22 will be held in firm engagement with the ratchet teeth, and no auxiliary means will be necessary to hold the pawl in the full line position shown in Fig. 15 as the position of the pivot 23 tends to rotate the handle 21 in a clockwise direction due to the clamping force and this clockwise movement is prevented by means of the handle 19'. Similarly when the handle 21 is drawn into the dotted line position, the same tends to remain in that position even though some clamping effect might be exerted on the pawl 22, in view of the fact that the pivot 23 is now arranged in such a position as to cause a counter-clockwise movement of the handle 21. The bar 16 carries a spring 25 secured thereto at 26 and arranged between the spuds 17 and 20 and in close proximity to the spud 17. The spring 25 is provided with an opening 27 through which the point of the spud 17 is adapted to extend. When the carriage support is clamped to the tree 1, the spring is moved to its dotted line position due to its engagement with the surface of the tree. When the clamping pressure is relieved, the spring 25 tends to move the spud 17 out of engagement with the tree, thus making it easier to remove the carriage support without the necessity of manually moving the bar 16 to disengage the spud 17 from the tree. The pawl 22 is also provided with a projection or stop 28 to limit the amount of clockwise movement that can be imparted to the pawl so that when the handle 21 is moved to the dotted line position shown in Fig. 15, the pawl may be shown clear of the ratchet teeth 18.

Figures 6, 7, 8, 9, 10, 11, 12, 13:
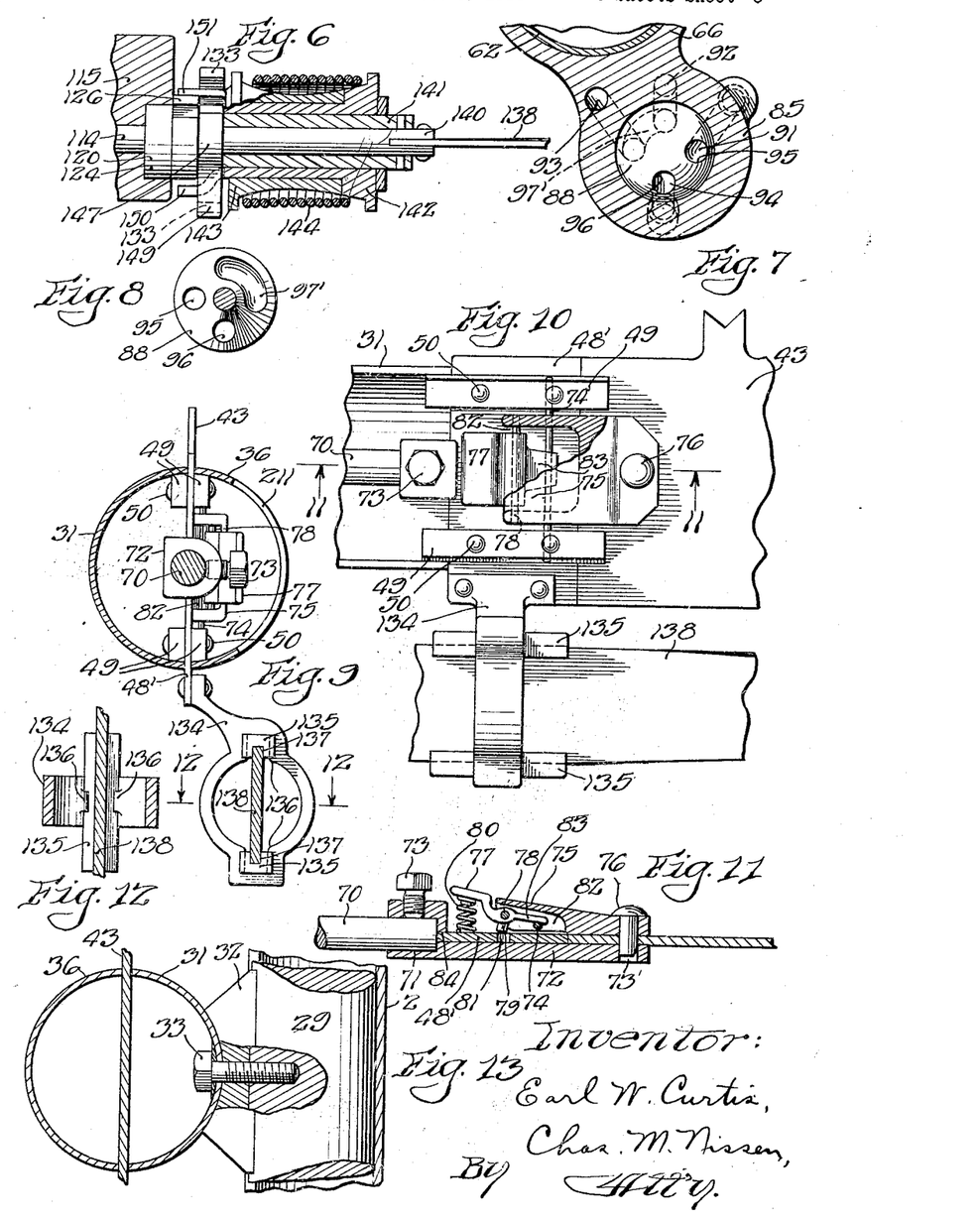
Fig. 6 is a section taken substantially along the line 6—6 of Fig. 4.
Fig. 7 is a cross-section taken substantially along the line 7—7 of Fig. 4.
Fig. 8 is a section taken substantially along the line 8—8 of Fig. 4.
Fig. 9 is a cross-section taken along the line 9—9 of Fig. 1.
Fig. 10 is a side view of the device as shown in Fig. 9 and looking from the right in that figure.
Fig. 11 is a cross-section taken along the line 11—11 of Fig. 10.
Fig. 12 is a section taken along the line 12—12 of Fig. 9.
Fig. 13 is a view showing the manner in which one of the guides for the saw is connected to the guide rod of the carriage which carries the saw supporting mechanism.

The saw carriage comprises a pair of rods 29 slidably arranged within the tubular guides 2 and 3. It will be noted from an inspection of Fig. 1 and also Figs. 16 and 23, that the tubular guides 2 and 3 have longitudinal slots therein. The rods 29 are connected together by means of a bar 30 and also by means of a semi-tubular member 31, which as will presently appear, also performs a function of a guide for the saw. The member 31, as best illustrated in Figs. 13 and 20 is secured to the guide rods 29 in the following manner: The guide rod 29 in the tubular guide 2 has a block 32 arranged between it and the member 31, the block 32 having surfaces thereon co-mating with the adjacent surfaces of the rod 29 and the member 31. A bolt 33 extends through the member 31, block 32 and into the rod 29 to secure these parts securely together.

The member 31 is secured to the rod 29 which slides in the tubular member 3 by means similar to that illustrated in Fig. 13 for connecting the member 31 to the rod 29 which slides in the tubular member 2. This means which is best illustrated in Fig. 20 comprises a block 32' similar to the block 32 and a bolt 33' similar to the bolt 33. However, in this instance a casting 34 has a portion 35 thereof interposed between the member 31 and the block 32', the portion 35 having a surface co-mating with the surface of the member 31 and a flat surface abutting above the flat surface of the member 32'. The casting 34 supports other mechanism which will be described later.

The bar 30 may be secured to the rods 29 in substantially the same manner as the member 31, it only being necessary to form the connecting means between the bar 30 and the rods 29 so that the bar will not strike the tubular guides 2 and interfere with the movement of the rods 29 in the tubular guides.

A second member 36 similar to the member 31 is secured by means of a rivet 37 or the like to the casting 34. The other ends of the members 31 and 36 are arranged within a circular recess in the casting 37 and secured thereto by means of the rivets 38 or the like. The adjacent edges of the semi-cylindrical members 31 and 36 are spaced apart substantially the width of the saw to be used and are for the purpose of guiding the saw during the reciprocation thereof.

The casting 34 has fitted therein one end of a U-shaped tubular member 39, and this is secured thereto by means of the bolt 40. The other end of the U-shaped member 39 is fitted within a circular recess within the casting 41 and is secured thereto by means of a rivet 42 or the like. As is best illustrated in Fig. 21, the casting 41 is slit at its upper end and along one side thereof for the reception of the saw 43. The casting 41 is also provided with the portions 42 only one of which is shown in Fig. 1 (the other being arranged on the opposite side of the saw 43) and each of the portions 42 carries a semi-tubular member 44 secured thereto by means of the rivets 45 and held in spaced relation to each other at their free ends by means of a clip such as the clip 46. This clip 46 is formed of two sections but may be formed in one section if desired, the two sections shown being held together by means of the rivet 47. The tubular guides 44 are secured to the clip 46 by means of the rivet 48 as best illustrated in Fig. 22.

By the arrangement just described tubular guides are formed for guiding the opposite ends of the saw 43 during its reciprocation and a free space is provided between the tubular guides by means of the tubular U-shaped member 39 which receives the trunk of the tree as the saw passes therethrough. However, other means must be provided within the tubular guides for guiding the saw and this means is best illustrated in Figs. 9, 20, 21 and 22.

A member 48' of substantially the same thickness as the saw and of substantially the same width is arranged adjacent the left hand end of the saw as best illustrated in Fig. 10 and has pairs of blocks 49 secured thereto by rivets 50, the blocks being greater in length than the member 48' and overlying the opposite faces of the saw blade so as to cause the member 48' to assume a position in prolongation of the saw blade.

It will be noted that the blocks 49 are curved adjacent the tubular guides 31 and 36 so as to form bearing surfaces between the blocks and the tubular guides. Similarly the opposite end of the saw is guided by means of the blocks 51 secured to the saw by means of the rivets 52, these blocks also being provided with bearing surfaces for engaging the curved inner surfaces of the members 31 and 36.

Provision must also be made for guiding the saw adjacent the edges of the space between the castings 34 and 41, or otherwise the saw is apt to vibrate or be thrown out of alinement during the cutting operation. This means is best illustrated in Figs. 20 and 21 and comprises set screws 53 and 54 arranged in the casting 34 and set screws 55 arranged in the opposed portions of the casting 41. These set screws engage the opposite sides of the saw 43 and permit varying the width of the space therebetween in which the saw reciprocates. The set screws 53, 54 and 55 also provide means for supporting the central portion of the saw. The set screws are held in place by means of the lock nuts 56, 57 and 58.

The means which has just been described for guiding the saw provides means whereby the saw is firmly guided while between the tubular guides therefor, and also is additionally supported adjacent the opening between the castings 34 and 41. Also it will be seen that a very nice adjustment may be obtained by means of the set screws arranged in the castings 34 and 41 thereby enabling one to regulate very readily the support given to the saw 43.

Figures 2, 2A, 3, 4, 5:
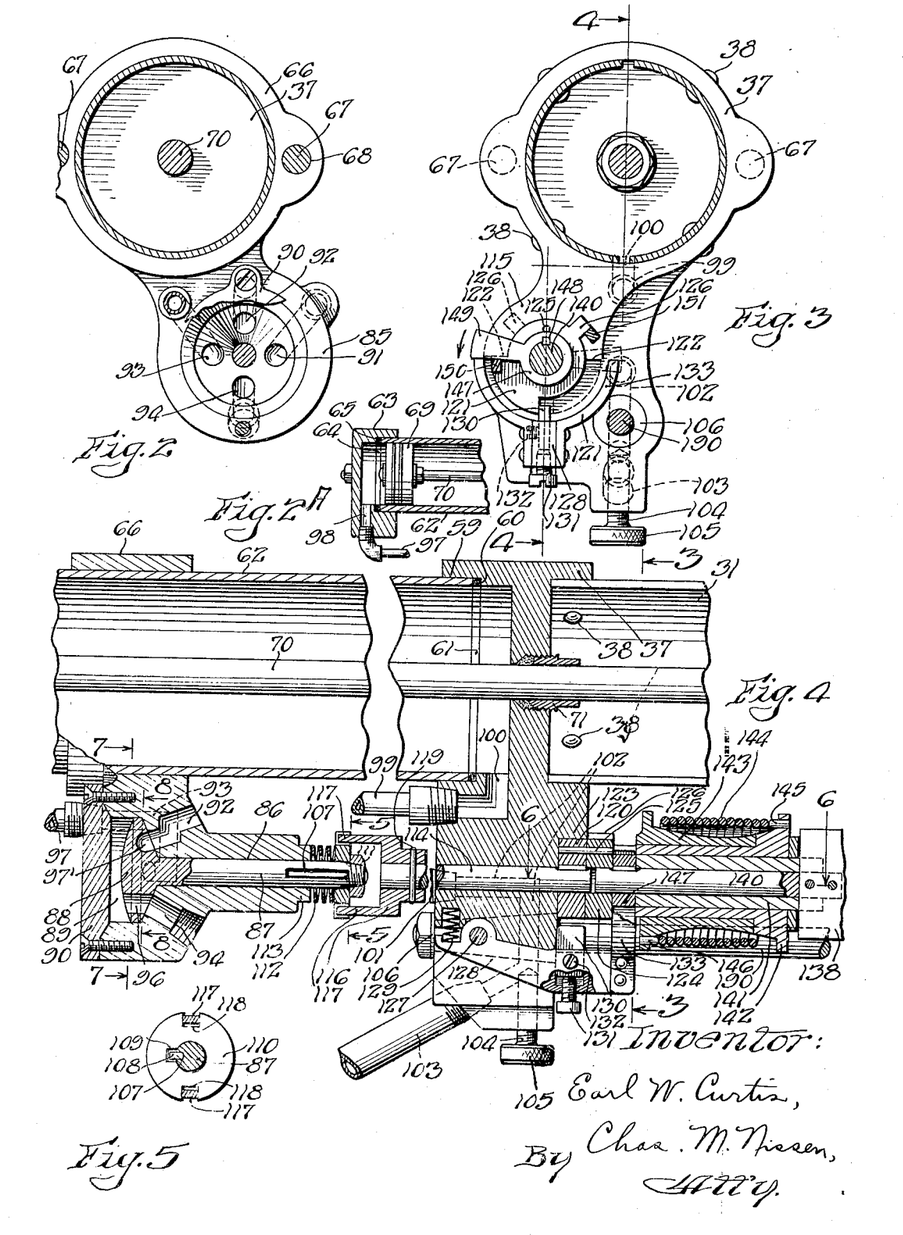
Fig. 2 is a section taken on the line 2—2 of Fig. 1.
Fig. 2A is a cross-section along through the left end of the cylinder shown in Fig. 1.
Fig. 3 is a cross-section taken on the line 3—3 of Fig. 4.
Fig. 4 is a section taken substantially along the line 4—4 of Fig. 3.
Fig. 5 is a section taken substantially along the line 5—5 of Fig. 4.

Referring more particularly to Figs. 2A and 4, it will be noted that the casting 37 has a cylindrical recess 59, and this recess has a shoulder 60 therein, against which a packing ring 61 is arranged and a tubular member 62 forming the cylinder has one end thereof arranged within the recess 59 and abutting against the packing 60. The other end of the tubular member 62 is arranged within a cylindrical recess in the casting 63, and a packing ring 64 is arranged between this end of the cylinder and a shoulder 65 in the recess. A casting 66 is arranged intermediate the ends of a cylinder and may be secured thereto in any suitable manner. Stud bolts 67 extend through the openings 68 in the casting 66 and through registering openings in the casting 63 (see Fig. 1) and are screw-threaded into the openings 68 in the casting 37. When these bolts are tightened, the castings 63 and 37 are drawn towards each other and this movement compresses the packing ring 61 and forms a tight connection or seal for the ends of the cylinder 62.

A piston 69 carried by piston rod 70 is arranged within the cylinder 62 and reciprocates therein, the piston rod extending through a stuffing box 71 in the casting 37 and into the space between the semi-tubular guides 31 and 36, and is connected to the saw 43 in the manner best illustrated in Figs. 9, 10 and 11.

In these figures it will be seen that the plate 48' is arranged in prolongation of the saw blade 43 with the pairs of blocks 49 arranged on opposite sides of the saw blade. The piston rod 70 has the end thereof arranged within a recess 71 in the member 72 as best illustrated in Fig. 11, and a set screw 73 holds the rod 70 in said recess. The member 72 is also provided with a recess 73'. A pin 74 is supported by means of the block 49, and the locking member 75 carrying a pin 76 is pivotally supported on the pin 74. A thumb piece 77 is pivoted at 78 to the locking member 75 and carries a projection 79 on the underside thereof, a spring 80 being used to rotate the thumb piece 77 in a clockwise direction as viewed in Fig. 11. The member 48' is provided with a recess 81 arranged substantially below the pivot 78 and is adapted to receive the projection 79. The locking member 75 is provided with a recess 82 and a finger 83 on the thumb piece 80 is arranged within this recess between the upper surface thereof and the pin 74.

With the parts in the position as shown in Fig. 11 when the thumb piece 77 is depressed or moved in a counter-clockwise direction, the finger 83 is moved upwardly into engagement with the upper surface of the recess 82 and further movement of the thumb piece in a counter-clockwise direction moves the locking member 75 in a counter-clockwise direction about the pivot 74, and raises the pin 76 out of the recess 73' and an alined recess in the saw 43, thus permitting the saw blade to be removed. It will be noted that the projection 79 normally is out of alinement with the opening 81 and therefore if pressure is accidentally applied to the member 75 the pin 76 cannot be released, and it is necessary to give an appreciable amount of movement to the thumb piece 77 before any movement is imparted to the pin 76. Therefore, it is almost impossible for the saw blade to be accidentally loosened although the device is such as to permit ready removal of the saw blade when desired. It will be noted that the member 72 also has a notch 84 adapted to receive the adjacent edge of the member 48' to assist in firmly holding the parts in their relative position. The projection 79 also prevents the release of the saw blade due to sidewise movement which might be imparted to the blade during the sawing operation.

The casting 66 is provided at its lower end with an offset portion 85 which has a longitudinal bore 86 in which the stem 87 of a rotary valve 88 is arranged. The casting is provided with a cylindrical recess 89 concentrically arranged with reference to the bore 86 and adapted to receive the head of the valve 88. A cover 90 is provided for enclosing the recess 89 at one end thereof, and the other end of the recess is provided with a plurality of openings 91, 92, 93, and 94, extending outwardly and axially from the bore 86 as is best illustrated in Figs. 2, 4 and 7. The head of the valve 88 is provided with openings 95 and 96 extending therethrough and an arcuate recess 97' arranged on the underside of the head as best illustrated in Fig. 8.

The valve 88 is adapted to have a movement of substantially 90 degrees.

In Fig. 7, I have shown the valve and the valve recess as viewed from the left in Fig. 1, with the recess 97' forming a communication between the openings 93 and 92 while the openings 95 and 96 in the valve head are in alinement with the openings 91 and 94 in the offset portion 85. In Fig. 7 the valve is shown in one of its extreme positions, the other extreme position being at 90 degrees from the position shown and to get to this other position, the valve is rotated in a clockwise direction as viewed in Fig. 7.

The opening 93 communicates with the left hand end of the cylinder by means of the conduit 97 which leads from the opening 93 to the opening 98 in the casting 63, this last mentioned opening extending into the recess formed in the casting 63. The opening 91 on the other hand communicates with the opposite end of the cylinder by means of the conduit 99, which extends from the opening 91 to the opening 100 formed in the casting 37 and communicates with the interior of the cylinder 62 on the opposite side of the piston 69. Therefore, it will be seen that if the fluid is admitted first to the conduit 97 and then to the conduit 99, the piston will be reciprocated within the cylinder 62. The opening 94 has a conduit 101 communicating therewith and with an opening 102 in the casting 37 as best illustrated in Figs. 1 and 4. This opening 102 is of substantially the shape illustrated by dotted lines in Fig. 4 and communicates with a conduit 103 which is operatively connected to a source of fluid supply and is the means for supplying fluid to the valve mechanism just described.

The needle valve 104 having an operating head 105 is screw-threaded into the casting 37 and extends into the vertical branch of the opening 102 and is used to regulate the cross-sectional area of the opening 102. A rotary valve 106 extends through the vertical branch of the recess 102, and has an opening therein, substantially in alinement with the opening 102 when the valve is in one position of adjustment. However, when the valve is rotated through substantially 45 degrees from the position shown in Fig. 3, the opening through the valve is out of alinement with the vertical branch of the opening 102 and fluid supply is thereby shut off from the conduit 101 and the piston will not reciprocate.

The fluid entering the opening 94 passes through the opening 96 into the recess 89 as shown in Figs. 4 and 7 and then out through the openings 95 and 91 to the conduit 99, thus supplying the fluid to the right hand of the cylinder 62 causing the piston to move to the left. As the piston moves to the left the air in the left hand end of the cylinder is forced out through the conduit 97 to the opening 93 and from there the fluid passes through the recess 97' to the opening 92 which is opened to the atmosphere and the fluid is exhausted in this manner. Of course if the fluid used is a liquid instead of air, then the openings 92 would obviously be provided with a connection which would permit the exhausted liquid to pass out of the opening 92 and into a drain or back to a reservoir where it could again be forced into the conduit 103. When the piston reaches the extreme left hand position of its movement as viewed in Figs. 1 and 2A, mechanism, which will presently be described rotates the valve through approximately 90 degrees so that the recess 97' connects the openings 92 and 95 and the openings 95 and 96 are arranged in alinement with the openings 94 and 93 respectively, and this arrangement permits the operating fluid to pass from the opening 94 through the opening 96 into the recess 89 and from there into the alined openings 95 and 93 and through the conduit 97 to the left hand end of the cylinder, thus causing the piston to move to the right, the exhaust fluid passing through the conduit fluid 99 through the openings 91 into the recess 97' and out through the exhaust opening 92. Thus it will be seen that a very simple and efficient arrangement is provided for actuating the piston.

Referring now more particularly to Figs. 4 and also Figs. 1, 5 and 6, it will be noted that the valve stem 87 is provided with a slot 107 for the reception of a key 108 which key engages within a slot 109 in the disk 110 and prevents the same from turning on the stem 87. It will be noted that the end of the stem is slightly tapered, and is arranged within a corresponding recess in the disk 110, a nut 111 co-operating with screw-threads on the end of the valve stem to hold the disk 110 on the end of the valve stem. A flat coil spring surrounds the stem 87 and abuts against the disk 110 and the boss 113 on the offset portion 85 to exert a yielding tension on the valve and cause the same to move to the right into firm engagement with its seat. The shaft 114 is arranged within the offset portion 115 in the casting 37, and this shaft is in alinement with the stem 87 and is provided with a member 116 having a pair of fingers 117 extending into the notches 118 in the disk 110, the member 116 being secured by means of a pin 119 to the shaft 114. Rotation of the shaft 114 imparts rotation to the valve 88 but does not have any tendency to impart longitudinal vibration or movement to the valve due to the fact that the engagement with the valve is such as to prevent relative sliding movement between the stem 87 and the shaft 114. In other words, the members 116 and 110 form an extensible connection.

The right hand end of the shaft 114 carries a disk 120 having a projection 121 (Fig. 3) adapted to engage the shoulders 122 on the portion 123 which overlies the disk 120. The shoulders 122 and projection 121 permit the shaft 114 to have substantially 90 degrees of rotation. A second disk 124 is secured by means of pins 125 (only one of which is shown) to the disk 120 so as to be constrained to move therewith and the disk 124 is provided with a projection 126 which is somewhat longer than the projection 121.

The offset portion 115 is provided with a pivot 127 upon which the lever 128 is pivotally mounted, a spring 129 is arranged within opposed recesses in the lever 128 and offset portion 115, tending to rotate the lever 128 in a counter-clockwise direction as viewed in Fig. 4. The lever 128 carries a stop 130 having a slot therein and a screw 131 extends through this slot and guides the stop 130. A second screw 132 acts as a means for adjusting the vertical position of the stop 130. The forward end of the lever 128 is provided with arcuate shaped members 133 as best illustrated in Fig. 3. The purpose of these members just described will be set forth later on in the description.

Referring now more particularly to Figs. 1, 9, 10 and 12, it will be seen that the member 48' is provided with a downwardly and outwardly extending bracket 134 having a substantially circular recess therein and provided with notches in this recess at the top and bottom thereof as illustrated in Fig. 9, the bearing blocks 135 being arranged within these recesses and being held therein by means of the projections 136 formed integral with the bracket 134. The bearing members 135 are provided with slots 137 adapted to engage the opposite edges of a spiral member 138 supported at one end by means of a shaft 139 arranged within the casting 34 and at the other end by means of a shaft 140 rotatably mounted within a recess in the disk 124. Both the shaft 139 and the shaft 140 are secured rigidly to the spiral strip, 138. The spiral strip 138 has approximately a twist of 180 degrees from one end thereof to the other so that as the saw 43 reciprocates, the shaft 140 will be given a rotation of 180 degrees due to the fact that bearings 135 in the bracket 134 rotate the spiral strip as the bracket is carried along with the saw during its reciprocation.

A sleeve 141 surrounds the shaft 140 and has a notch in one end thereof in which the spiral strip 138 is arranged, so that rotation of the spiral strip 138 not only rotates the shaft 140, but also the sleeve 141. The sleeve 141 forms a bearing for the sleeve 142 and the sleeve 142 in turn forms a bearing for the sleeve 143. A coil spring 144 surrounds the sleeves 143 and 142, and has one end thereof secured to the flange on the sleeve 142 at 145 and has the other end thereof secured to the flange on the sleeve 143 at 146. By this arrangement it will be seen that by moving the sleeves 142 and 143 relatively to each other, the coil spring 144 is placed under tension, the sleeves having a normal position of rest with respect to each other. The shaft 140 has a disk 147 keyed thereto at 148 and is provided with an extremely long projection 149 as best illustrated in Fig. 3. This projection is sufficiently long to engage the uppermost ends of the arcuate members 133 for a purpose later to be described. The sleeve 142 (see Fig. 6) is provided with a lug 150 extending forwardly thereof into the path of movement of both the projection 126 and the projection 149. Similarly the sleeve 143 is provided with a lug 151.

The operation of this part of the mechanism is as follows:

With the parts in the positions as shown in the drawings it is assumed that the piston is almost at the extreme end of its travel towards the left and that the projection 149 has just engaged the arcuate member 133 and is still continuing its movement in a counter-clockwise direction. Further movement of the projection 149 moves the arcuate member 133 and consequently the lever 128, downwardly, moving the stop 130 out of the path of the projection 121 and permitting the stop 126 to move to its dotted line position in view of the fact that the movement of the projection 149 in a counter-clockwise direction tensioned the spring 144 by moving the lug 150 away from the lug 151. The energy of the spring stored during the movement of the lug 150 away from the lug 151 causes a quick rotation of the shaft 114 as soon as the stop 130 is moved out of the path of the projection 121. The movement of the projection 121 is limited by the shoulder 122 as previously described. The quick rotation of the shaft 114 rotates the valve 88 through 90 degrees and immediately the fluid flows to the opposite end of the cylinder which in this case is the left hand end of the cylinder and this moves the piston to the right.

As the piston moves to the right, the spiral member 138 rotates the shaft 140 in a clockwise direction and carries with it the lug 149, the stop 126 preventing movement of the lug 151 any farther than the dotted line position shown for the projection 126 in Fig. 3. However, the projection 149 moves the lug 151 to its extreme right hand position and when as before, the lug 149 strikes the arcuate member 133 at the right, the projection 121 is released and moves back to the full line position illustrated in Fig. 3 again rotating the valve to the full line position shown in Fig. 7, and causing reversal of the movement of the piston.

It is necessary to provide means for feeding the carriage towards the tree being sawed and for this purpose I provide a plurality of eccentrics 152 and 153 which are surrounded by the bearing members 154 and 155 of the arms 156 and 157 respectively. Therefore, as the spiral member 138 rotates, the shaft 139 will rotate and the eccentrics 152 and 153 will reciprocate the arms 156 and 157 which are substantially tubular and receive the shanks of the pawls 158 and 159. The shanks are provided with pins 160 and 161 extending transversely to the shank and through slots 162 and 163 in the arms 156 and 157. Additional slots 164 and 165 in the arms 156 and 157 are adapted to receive the wedge-shaped members 166 and 167. Springs 168 and 169 surround the members 156 and 157 and abut against the pins 160 and 161 respectively, and also the wedge-shaped members 166 and 167 to normally urge the pawls towards the ends of the slots in the arms 156 and 157.

To vary the amount of compression imparted to the springs 168 and 169, I connect the wedge-shaped members 166 and 167 by links 170 and 171 to a pivot 172 on an arm 173 pivoted at 174 to the plate 174' secured to the casting 34 in the manner best illustrated in Fig. 1. A thumb piece 175 pivoted at 176 to the lever 173 has a finger 177 thereon adapted to engage notches 178 in the plate 174'. By moving the finger 177 into various notches 178, the wedge shaped members will increase or decrease the compression of the springs 168 or 169 for a purpose which will appear presently.

A bar 179 having a set of ratchet teeth 180 is secured to casting 7 at 181, 182 and 183, the forward edges of the pawls 158 and 159 overlie one another and are adapted to engage the teeth 180 on the bar 179 and the reaction is such as to move the carriage towards the tree being cut. The rotation of the eccentrics 152 and 153 move the arms 156 and 157 to thereby actuate the pawls 158 and 159 and the force with which the pawls 158 and 159 engage the teeth 180 is determined by the compression of the springs 168 and 169. Naturally the grater the compression of the springs the greater will be the feed and the greater will be the force with which the saw is fed towards the tree.

In order to disengage the pawls from the teeth 180, so as to permit return of the saw carriage to its original inoperative position, I provide a lever 184, pivoted at 185 to an outwardly extending portion 186 on the plate 174', a spring detent 187 holding the lever 184 in either its full line or dotted line position shown in Fig. 19. The lever 184 is provided with integral fingers 188 which underlie the arms 156 and 157 and springs 189 overlie the arms 156 and 157 so that when the lever 184 is in the full line position as shown in Fig. 19, the pawls are held yieldingly in engagement with the ratchet teeth, but when the lever is rocked to its dotted line position, the projections 188 move the pawls positively out of engagement with the ratchet teeth, thereby discontinuing the feed and permitting the carriage to be returned to the position shown in Fig. 1.

I previously pointed out that the rotary valve 106 controlled the fluid leading to the valve operating mechanism in the casting 66, and I prefer to provide this valve with a rod 190 connected thereto at one end and having its other end bearing in the casting 34 as best illustrated in Figs. 1 and 17. I provide the rod 190 with a hand operating lever 191' so that I may manually control the valve if desired. I also secure thereto (see particularly Figs. 14 and 15) an arm 191 by means of a set screw 192. The rod 29 which slides in the bearing 2 is provided with a bearing 193 for the rod 190.

Additional bearings 194 and 195 slidably support a bar 196 having ratchet teeth 197 thereon and the casting 4 is also provided with bearings 199 and 198 which also slidably support the bar 196. The lower end of the bar 196 has a lug 200 secured thereto by means of a set screw 201, and a spring 202 is interposed between the bearing 195 and the lug 200 to normally urge the rod upwardly as viewed in Fig. 1 and Fig. 14. A pin 203 passes through the upper end of the bar 196 and an arm 204 has forked extensions 205 underlying the pin 203. The opposite end of the arm 204 is pivoted at 205' to the arm 191, therefore, when the bar 196 is moved downwardly this will cause the arm 204 to move downwardly due to the engagement of the pin 203 with the forked extension 205. This downward movement of the arm 204 will rock the arm 191 and thereby rotate the rod 190 and close the rotary valve 106.

When the cutting operation has been completed, and it is desired to unclamp the carriage support from the tree, it is also desirable to stop the reciprocation of the piston and as a result the reciprocation of the saw. In order to insure that the saw will be stopped, at least as soon as the carriage support is unclamped from the tree, I provide the following mechanism: The lever 21 is provided with a second pawl 206 pivoted to the lever at 207 and the spring 208 normally rotates the pawl in a counter-clockwise direction, (as viewed in Fig. 15), a stop 209 is provided on the pawl and limits the amount of counterclockwise rotation which can be imparted thereto by means of the spring 208, the stop being such that when the clamp is in the full line position, a pawl 206 will be out of engagement with the teeth on the ratchet bar 196. However, assuming that the parts are in the positions shown in Figs. 1, 14 and 15, it will be noted that as the handle 21 is moved in a counter-clockwise direction to release the clamping spuds from the tree, the pawl 206 will engage the teeth 197 and move the bar 196 downwardly causing the pin 203 to move the arm 204 downwardly and thus rock the arm 191 and close the valve 106, the closing of the valve 106 stopping the reciprocation of the saw.

It is necessary however, that the pawl 206 be released immediately from its engagement with the ratchet teeth 197 to enable one to again move the saw supporting carriage into an operative position. For this purpose the pawl 206 is provided with a bellied portion 210 which engages the teeth after a predetermined movement of the handle 21 as is best illustrated by the dotted line in Fig. 15. This releases the pawl 206 from the ratchet teeth and permits a further movement of the handle 21 so as to more readily disengage the pawl 22 from the teeth 18 on the bar 16.

The tubular guide member 36 is provided with a hand hole 211 to enable one to operate the thumb piece 77 and thereby release the saw in the manner previously described, and gives access to the stuffing box also.

In Figs. 24, 25 and 26 I have shown a modification of the device illustrated in Fig. 6. This modification shows sleeves 142' and 143' rotatably supported on the shaft 140 and sleeve 142' respectively. An enlarged cylindrical end 212 on the sleeve 143' houses a spring 213 secured to the shaft 140 and to the cylindrical casing 212. Similarly the sleeve 142' has a cylindrical portion 214 housing a spring 215 secured to the cylindrical portion 214 and also to the shaft 140. The sleeve 142' carries a lug 151' similar to the lug 151 illustrated in Fig. 6 and the sleeve 143' carries a lug 150' similar to the lug 150 illustrated in Fig. 6. The remaining parts illustrated in Fig. 24 correspond to the similar parts shown in Fig. 4 and are referred to by corresponding numerals.

Obviously those skilled in the art to which this invention pertains may make various changes in the construction and arrangement of parts without departing from the spirit and scope of this invention as defined by the claims hereto appended, and therefore I do not wish to limit my invention to the details of the invention as shown in the embodiment disclosed in the drawings.

Having thus fully described my invention, what I desire to secure by Letters Patent of the United States is:

1. A cross-cut sawing machine comprising a reciprocating saw, fluid actuated means for reciprocating said saw, a valve for controlling said fluid actuated means to reverse the movement of said saw, and means for actuating said valve substantially instantaneously when said saw reaches pre-determined positions, and independently of any further movement of the saw in the direction the same is travelling when any of said positions are reached.

2. A cross-cut sawing machine comprising a reciprocating saw, a piston for reciprocating said saw, means for moving said piston in opposite directions to thereby move said saw in opposite directions, and means operated by the reciprocation of said saw for reversing the movement of said piston, said last mentioned means comprising a quick acting operating device in which energy is stored during reciprocation of said saw and which energy is wholly released when said saw reaches a predetermined position so that no further movement of said saw is necessary to cause said energy storing means to act.

3. A cross-cut sawing machine comprising a reciprocating saw, a fluid operated piston for actuating said saw, a valve for controlling said fluid to thereby cause said fluid to move said piston in different directions and actuating means for said valve adapted to store energy during a portion of the stroke of said piston, and means for releasing said actuating means at a predetermined time during the stroke of said piston to cause reversal of the movement of said piston.

4. A cross-cut sawing machine comprising a fluid actuated saw, a valve for controlling said fluid to impart movement to said saw in opposite directions, means for imparting movement to said valve to cause reverse movement of said piston at a predetermined time, said last mentioned means being adapted to store energy during a portion of the stroke of said piston without operating said valve, and means for wholly releasing said valve actuating means at a predetermined time to permit the same to actuate said piston.

5. A cross-cut sawing machine comprising a saw, a cylinder, a piston within said cylinder and connected to said saw, means for introducing fluid into said cylinder on opposite sides of said piston, a valve for determining on which side of the cylinder the fluid is to be introduced, and means operated by said saw for storing energy during the movement of said saw, said means being released to expend said energy and operate said valve at a predetermined time during the stroke of said piston.

6. A cross-cut sawing machine comprising a saw, fluid actuated means for reciprocating said saw, a valve for controlling said fluid actuated means, a spring, means for storing energy in said spring as said saw reciprocates, and means for releasing the energy stored in said spring to thereby cause said spring to actuate said valve to reverse the movement of said saw.

7. A cross-cut sawing machine comprising a support adapted to be secured to the object to be sawed, a carriage mounted for reciprocation upon said support, feeding means for feeding said saw towards the object to be cut, and means carried by said machine for quickly and readily varying the pressure with which said saw is urged against the object being cut, independently of the amount and rate of feed.

8. A cross-cut sawing machine comprising a frame having means for clamping the same to the object to be cut, a carriage mounted for reciprocation on said frame, a saw mounted on said carriage, fluid pressure means for actuating said saw, and means operable when said clamping means is actuated to release said frame for rendering said fluid means inoperative.

9. A cross-cut sawing machine comprising a carriage, a support upon which said carriage is movably mounted, a saw, a fluid means for actuating said saw, a clamping bar for clamping said support to the object being cut, means for actuating said clamping bar, and means operable by said actuating means to render said fluid means inoperative when said clamping bar is released.

10. A cross-cut sawing machine comprising a support, a saw mounted for reciprocation on said support, a cylinder, a piston mounted for reciprocation in said cylinder, means for introducing fluid into the opposite ends of said cylinder, a valve for selectively determining which end of the cylinder the fluid will be supplied to, a spring for rotating said valve, means for preventing rotation of said valve by said spring, a member operatively connected to said spring and having operative connection with said saw, said operative connection with said saw being adapted to store energy in said spring during the reciprocation of said saw, and means for rendering inoperative the means which holds the spring from actuating said valve at selected positions of said saw in its path of movement.

11. A cross-cut sawing machine comprising a reciprocating saw, a fluid actuated piston for moving said saw, a valve for controlling the fluid to said fluid actuating means, a coil spring for actuating said valve, a spiral member in prolongation of the axis of said coil spring, operative connections between said spiral member and the saw actuating means for rotating said spiral member as said saw reciprocates, the rotation of said spiral member storing energy in said spring during the reciprocation of said saw, and means for releasing said stored energy in said spring at predetermined times during the reciprocation of said saw so that said spring will actuate said valve.

12. A reversing valve actuating means for fluid operated cross-cut sawing machines comprising a member operatively connected to said valve, a stop on said member, an abutment movably supported on a relatively fixed support, and adapted to engage said stop, a spring having operative connection with said valve means for storing energy in said spring, said abutment normally preventing the actuation of said member by said spring, and means for moving said abutment out of engagement with said stop so as to permit said spring to actuate said member and thereby said valve.

13. A device as claimed in claim 12 in which said abutment is operable alternately to prevent movement of said member in opposite directions and in which said spring is operable to move said member in opposite directions when said abutment alternately releases said stop.

14. A device as claimed in claim 12 in which said abutment alternately prevents movement of said member in opposite directions and in which an additional spring is used to move said member in a direction opposite to the direction in which said first mentioned spring is adapted to move said member and in which means is provided for storing energy in said second mentioned spring.

15. A cross-cut sawing machine comprising a saw, a reciprocating fluid means for actuating said saw, a valve for controlling said fluid actuating means, a spring for controlling movement of said valve, means for holding said spring inoperative while said saw reciprocates over a portion of its path, a spiral member operatively connected to said spring and to said saw for rotating one end of said spring and storing energy therein during the movement of said saw over said portion of its path, and feeding means operatively connected to said spiral member for feeding said saw towards the object to be cut.

16. A cross-cut sawing machine comprising a saw, a reciprocating fluid means for actuating said saw, a valve for controlling said fluid actuating means, a spring for controlling movement of said valve, means for holding said spring inoperative while said saw reciprocates over a portion of its path, a spiral member operatively connected to said spring and to said saw for rotating one end of said spring and storing energy therein during the movement of said saw over said portion of its path, and feeding means operatively connected to said spiral member for feeding said saw towards the object to be cut, said feeding means comprising a pawl and ratchet and means for moving said pawl and ratchet relative to each other.

17. A cross-cut sawing machine comprising a support, a saw, a carriage slidably supporting said saw mounted for reciprocation on said support, a piston operatively connected to said saw, a cylinder in which said piston reciprocates, a valve, means for supplying fluid to said valve, means for moving said valve to control the fluid admitted to said cylinder, a spiral member operatively connected to said valve by means of a spring, an operative connection between said saw and said spiral member for causing said spiral member to rotate as said saw reciprocates, means for holding said valve stationary as said spiral member rotates to thereby store energy in said spring, and means for releasing said last mentioned means when said saw reaches a predetermined position.

18. A cross-cut sawing machine comprising a support, a carriage mounted on said support, a saw movably mounted on said carriage, a rack on said support, a plurality of pawls engaging said rack, and means for alternately actuating said pawls against the teeth on said rack for moving said carriage along said support, operative connections between said saw and said pawls for actuating the latter in the aforementioned manner, and means for yieldingly urging said pawls against the teeth of said rack to impart a yielding movement to said carriage in the direction in which the same is being fed and impart a yielding pressure to said saw on the object being cut when the saw is in engagement with said object.

19. A cross-cut sawing machine comprising a reciprocating saw, a spiral member operatively connected to said saw and rotated when said saw reciprocates, a carriage upon which said saw is mounted for reciprocation, a support upon which said carriage travels, and pawl and ratchet mechanism actuated by said spiral member as it rotates for moving said carriage along said support.

20. A cross-cut sawing machine comprising a reciprocating saw, mechanism for driving said saw in opposite directions, a spiral member operatively connected to said saw, said operative connection including means for causing said spiral member to rotate as said saw reciprocates, feeding means operatively connected to said spiral member for feeding said saw toward the object to be cut, said feeding means comprising a pawl and ratchet, and means for moving said pawl and ratchet relative to each other.

21. A cross-cut sawing machine comprising a saw, means for reciprocating said saw, and means for detachably connecting said saw to said reciprocating means comprising a movable pin on said reciprocating means adapted to pass through an opening in said saw and an opening in said reciprocating means to prevent relative movement of said saw, and reciprocating means relative to each other in the direction of the reciprocation of said saw, finger operated means for releasing said pin from said openings, and means for preventing release of said pin except by said finger operating means.

22. A cross-cut sawing machine comprising a frame upon which said saw is mounted and means for releasably holding said frame on the object to be cut comprising a spud on said frame, an adjustable bar carried by said frame having a spud in opposition to said first mentioned spud, means for actuating said bar relative to said frame to advance said spuds toward each other and for holding said spuds in firm engagement with the object to be cut, and means acting closely adjacent the point of engagement of one spud with the object for moving that spud out of gripping engagement with the object to be cut if and when the clamping pressure is released.

23. In a cross-cut sawing machine the combination with a carriage, of a saw mounted for reciprocation on said carriage, a fluid motor for reciprocating said saw, means for actuating said fluid motor in opposite directions, a rotatable valve for controlling said last mentioned means, a spring concentrically mounted with respect to the axis of rotation of said valve, means for storing energy in said spring as said saw reciprocates comprising a spiral member operatively connected to said spring and to said saw and rotated by the latter, a stop for preventing actuation of said valve by said spring until said saw reaches any one of a plurality of positions in its path of movement, and means for moving said stop out of operative position at any of said positions to permit said spring to actuate said valve, and to thereby cause reversal of the means which reciprocates said saw.

24. In a cross-cut sawing machine the combination with a reciprocating saw of a carriage upon which said saw is mounted, means for advancing said carriage in a rectilinear path comprising pawl and ratchet mechanism, an eccentric upon which said pawl is mounted, a spiral member for rotating said eccentric, operative connections between said spiral member and said saw to cause rotation of said spiral member as said saw reciprocates, and to thereby cause rotation of said eccentric and reciprocation of said pawl for the purpose of advancing said saw in the direction of its feeding movement.

25. A device as claimed in claim 24 in which means are provided for urging said pawl against the teeth with a yielding pressure, and in which means are provided for varying the tension in said means independently of the amount and rate of feed of said saw in the direction of its feeding movement.

26. In a cross-cut sawing machine the combination with a carriage, of a support for said carriage, a rack on said support, a plurality of pawls on said carriage engaging said rack, means for alternately moving said pawls against the teeth of said rack to cause said pawls to move said carriage along said support, springs for yieldingly holding said pawls against said rack to impart a yielding pressure on said carriage in the direction of its speeding movement, and means actuated independently of the amount and rate of feeding movement for varying the pressure with which the pawls are urged against said rack.

27. In a cross-cut sawing machine the combination with a reciprocating saw, of a tubular guide for said saw, adjustable means for engaging said saw to guide the same in its path of movement, means for reciprocating said saw, and means for detachably connecting said saw to said reciprocating means, said tubular guide having an opening therein to permit access to said means for detachably connecting said saw and reciprocating means.

28. In a cross-cut sawing machine the combination with a reciprocating saw, of a rotated spiral member having its axis of rotation substantially parallel with the path of reciprocation of said saw, means operatively connected to said saw adapted to engage said spiral member to rotate the same as said saw reciprocates, mechanism for actuating said saw, means for reversing the direction of movement of said actuating means, means for feeding said saw toward the object to be cut, and operative connections between said spiral member and said reversing means and feeding means to cause reversal of the movement of said saw and the feeding of said saw when said spiral member is rotated.

29. A cross-cut sawing machine comprising a reciprocating saw, means for reciprocating said saw, mechanism for reversing the movement of said reciprocating means, means for actuating said reversing means substantially instantaneously when said saw reaches a predetermined position in its path of travel and independently of any further movement of the saw in the direction in which the same is traveling when any of said positions are reached, and means for positively preventing any actuation of said reversing means until said reversing means reaches one of said predetermined positions in which the actuating means is released to completely reverse the movement of said reciprocating means substantially instantaneously.

30. A cross-cut sawing machine comprising a reciprocating saw, mechanism for reciprocating said saw, and means operated by said saw as it reciprocates for causing said mechanism to reverse the movement of said saw, said last mentioned means comprising a substantially instantaneously operating member in which the energy is entirely released when said saw reaches a predetermined position, thereby causing the reversal of the movement of said saw without the necessity of further movement of said saw past the position at which the substantially instantaneously operating member is released, said member being inactive to actuate said reversing means until said saw reaches said predetermined position.

31. A cross-cut sawing machine comprising a reciprocating saw, mechanism for driving said saw alternately in opposite directions, a device for causing said mechanism to move in opposite directions alternately, means for storing energy in said device during reciprocation of said saw, said device including a spring in which said energy is stored without affecting the position of the means which causes reversal of the movement of said mechanism, and means for releasing said device substantially instantaneously when said saw reaches any one of a plurality of positions in its path of movement.

32. A cross-cut sawing machine comprising a reciprocating saw, a spiral member operatively connected to said saw and rotated when said saw reciprocates, a carriage upon which said saw is mounted for reciprocation, a support on which said carriage travels and feeding mechanism actuated by said spiral member as it rotates for moving said carriage along said support.

33. A cross-cut sawing machine comprising a frame upon which said saw is mounted and means for releasably holding said frame on the object to be cut comprising a spud on said frame, an adjustable bar carried by said frame having a spud in opposition to said first mentioned spud, means for actuating said bar relative to said frame to advance said spuds toward each other and for holding said spuds in firm engagement with the object to be cut, and means for moving one of said spuds out of gripping engagement with the object to be cut if and when the adjustable bar is released, comprising a spring having an opening therein through which the spud is projected during the clamping of the frame to the object to be cut, said spring being forced back out of a position in front of said spud when the clamping pressure is applied to the spuds.

34. A cross-cut sawing machine comprising a frame having means for clamping the same to the object to be cut, a carriage mounted for reciprocation on said frame, a saw mounted for movement on said carriage, fluid pressure means for actuating said saw and means operable when said clamping means is released to release said frame and for rendering said fluid means inoperative, comprising a valve for controlling the movement of said fluid pressure means, said valve having a neutral position for stopping the movement of said fluid pressure means, a movable member connected to said valve for moving said valve to said neutral position and means actuated when said clamping means is released for moving said movable member.

35. A cross-cut sawing machine comprising a frame having a clamping means for clamping the frame to an object, a saw mounted for reciprocation on said frame, a valve movable to a neutral position to render said fluid pressure means inoperative, a pawl on said clamping means, a ratchet connected to said valve, said pawl engaging said ratchet to move said valve to a neutral position when said clamping means is released.

36. A device as claimed in claim 35 in which said clamping means comprises a pair of members movable toward each other by additional pawl and ratchet mechanism and an operating lever for releasing said pawl and ratchet mechanism and actuating said first mentioned pawl and ratchet mechanism to move said valve to a neutral position.

In testimony whereof I have signed my name to this specification on this 1st day of February, A. D. 1930.

EARL W. CURTIS.